United States Patent
Li et al.

(10) Patent No.: US 10,484,156 B2
(45) Date of Patent: Nov. 19, 2019

(54) SEARCH SPACE ASSOCIATED WITH PHYSICAL DOWNLINK CONTROL CHANNEL BASED ON CHANNEL QUALITY INDICATORS

(71) Applicant: QUALCOMM Incorporated, San Diego, CA (US)

(72) Inventors: Chong Li, Weehawken, NJ (US); Junyi Li, Chester, NJ (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/712,093

(22) Filed: Sep. 21, 2017

(65) Prior Publication Data
US 2018/0139023 A1 May 17, 2018

Related U.S. Application Data

(60) Provisional application No. 62/423,128, filed on Nov. 16, 2016.

(51) Int. Cl.
| | |
|---|---|
| *H04W 4/00* | (2018.01) |
| *H04L 5/00* | (2006.01) |
| *H04W 74/08* | (2009.01) |
| *H04L 5/06* | (2006.01) |
| *H04W 84/04* | (2009.01) |

(52) U.S. Cl.
CPC .......... *H04L 5/0051* (2013.01); *H04L 5/0053* (2013.01); *H04L 5/0082* (2013.01); *H04L 5/0085* (2013.01); *H04L 5/0094* (2013.01); *H04L 5/06* (2013.01);
(Continued)

(58) Field of Classification Search
USPC .......................................... 370/241, 329, 328
See application file for complete search history.

(56) References Cited

U.S. PATENT DOCUMENTS

| | | | |
|---|---|---|---|
| 8,711,671 | B2 | 4/2014 | Frederiksen et al. |
| 9,071,411 | B2 | 6/2015 | Park et al. |
| | | (Continued) | |

OTHER PUBLICATIONS

Ericsson et al., "On Collision between Common and UE Specific Search Spaces", 3GPP Draft; R1-103505, 3rd Generation Partnership Project (3GPP), Mobile Competence Centre, 650, Route Des Lucioles, F-06921 Sophia-Antipolis Cedex, France, vol. RAN WG1, No. Dresden, Germany; Jun. 22, 2010, XP050449024, [retrieved on Jun. 22, 2010], 3 pages.

(Continued)

*Primary Examiner* — David Q Nguyen
(74) *Attorney, Agent, or Firm* — Arent Fox LLP

(57) ABSTRACT

A first apparatus may send, to a base station, a set of channel quality indicators associated with a set of channels. The first apparatus may monitor sets of control channel elements in a search space based on the set of channel quality indicators sent to the base station. A second apparatus may receive, from a first user equipment, a set of channel quality indicators associated with a set of channels. The second apparatus may send, based on the set of channel quality indicators received from the first user equipment, control information on a physical downlink control channel associated with the first user equipment in a search space specific to the first user equipment.

30 Claims, 12 Drawing Sheets

(52) U.S. Cl.
CPC ....... *H04W 74/0858* (2013.01); *H04L 5/0007* (2013.01); *H04W 84/042* (2013.01)

(56) References Cited

U.S. PATENT DOCUMENTS

| | | | |
|---|---|---|---|
| 9,357,420 B2 | 5/2016 | Ahn et al. | |
| 9,516,670 B2 | 12/2016 | Kim et al. | |
| 9,986,444 B2* | 5/2018 | Kim | H04B 7/024 |
| 2013/0058285 A1 | 3/2013 | Koivisto et al. | |
| 2013/0322376 A1* | 12/2013 | Marinier | H04W 72/06 370/329 |
| 2014/0269338 A1* | 9/2014 | Jung | H04L 5/0055 370/241 |
| 2014/0328302 A1 | 11/2014 | Park et al. | |
| 2016/0192388 A1* | 6/2016 | Ekpenyong | H04W 72/1284 370/329 |
| 2016/0242161 A1 | 8/2016 | Webb | |
| 2017/0155488 A1* | 6/2017 | Saxena | H04L 5/0053 |
| 2017/0195029 A1* | 7/2017 | Nammi | H04B 7/0456 |

OTHER PUBLICATIONS

Intel Corporation: "Search Space Design of ePDCCH", 3GPP Draft; R1-113949, 3rd Generation Partnership Project (3GPP), Mobile Competence Centre, 650, Route Des Lucioles, F-06921 Sophia-Antipolis Cedex, France, vol. RAN WG1, No. San Francisco, USA; Nov. 8, 2011, XP050561999, [retrieved on Nov. 8, 2011], 4 pages.
International Search Report and Written Opinion—PCT/US2017/061708—ISA/EPO—dated Feb. 2, 2018.

\* cited by examiner

SEARCH SPACE ASSOCIATED WITH PHYSICAL DOWNLINK CONTROL CHANNEL BASED ON CHANNEL QUALITY INDICATORS

CROSS-REFERENCE TO RELATED APPLICATION(S)

This application claims the benefit of U.S. Provisional Application Ser. No. 62/423,128, entitled "SEARCH SPACE ASSOCIATED WITH PHYSICAL DOWNLINK CONTROL CHANNEL BASED ON CHANNEL QUALITY INDICATORS" and filed on Nov. 16, 2016, which is expressly incorporated by reference herein in its entirety.

BACKGROUND

Field

The present disclosure relates generally to communication systems, and more particularly, to a base station configured to schedule a physical downlink control channel for user equipment based on channel quality indicators.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In various aspects, a search space may include a set of control channel element (CCE) locations where a user equipment (UE) may find a physical downlink control channel (PDCCH) (including, for example, an enhanced or evolved PDCCH (ePDCCH). The search space may include a common search space, which may be monitored by all UEs in a cell, and a UE-specific search space, which may be monitored by a specific UE in a cell. According to various communications standards, such as Long Term Evolution (LTE), a search space may be dependent upon a UE identifier (ID). Further, the search space may be semi-persistent—e.g., a UE-specific search space may be assigned to a UE as long as an association between the UE and a base station is established.

When a UE experiences a relatively weak link with a base station (e.g., due to cell-edge case or interference), the UE may select a relatively high aggregation level (e.g., aggregation level 8) for detecting downlink control information carried on a PDCCH in a search space. However, if the pre-assigned CCEs for that selected relatively high aggregation level (e.g., level-8 CCEs) experience relatively strong fading on channels, a PDCCH may not reliably go through and be detected by a UE. In existing search space mechanisms, PDCCH frequency diversity is not dynamically implemented. Dynamically scheduling a search space may benefit a UE, for example, in slow-fading environments.

A first method, a first apparatus, and a first computer-readable medium may be described in the present disclosure. The first apparatus may be a UE. The first apparatus may send, to a base station, a set of channel quality indicators (CQIs) associated with a set of channels. The first apparatus may monitor sets of control channel elements (CCEs) in a search space based on the set of channel quality indicators sent to the base station. The first apparatus may determine a plurality of channel qualities associated with a plurality of channels, and may select the set of channels from the plurality of channels based on the determined plurality of channel qualities. The first apparatus may receive control information carried on a physical downlink control channel (PDCCH) associated with the first apparatus based on the monitoring of the sets of CCEs in the UE-specific search space. In an aspect, the control information is further carried on the PDCCH in another set of CCEs in a common search space. In an aspect, the first apparatus may further receive, from the base station via radio resource control (RRC) signaling, information indicating the set of CCEs to monitor in the UE-specific search space and a common search space.

A second method, a second apparatus, and a second computer-readable medium may be described in the present disclosure. The second apparatus may be a base station. The second apparatus may receive, from a first UE, a set of CQIs associated with a set of channels. The second apparatus may determine, based on the received set of CQIs, a first set of CCEs for a UE-specific search space specific to the first UE for receiving a PDCCH. The second apparatus may send, based on the determined first set of CCEs, downlink control information on the PDCCH in the UE-specific search space specific to the first UE. The second apparatus may send at least a portion of the downlink control information on the PDCCH in a common search space. The second apparatus may detect a collision between the first set of CCEs associated with the first UE and a second set of CCEs associated with a second UE, wherein downlink control information associated with the second UE is sent in the common search space based on the detected collision. The second apparatus may decode each CQI of the received set of CQIs, and detect a decoding failure associated with at least one CQI of the received set of CQIs, wherein the downlink control information carried on the PDCCH is sent in the common search space based on the detected decoding failure. In an aspect, the first set of CCEs is determined based on a plurality of received sets of CQIs, each set of CQIs associated with a respective subframe. The second apparatus may send, to the first UE via RRC signaling, information indicating at least one of the first set of CCEs associated with the UE-specific search space specific to the first UE or a second set of CCEs associated with a common search space, wherein the downlink control information carried on the PDCCH is carried on the at least one of the first set of CCEs or the second set of CCEs. The second apparatus may receive, from the first UE, a second set of CQIs associated with a second set of channels, determine, based on the second set of CQIs, a second set of CCEs for second downlink control information carried on the PDCCH, and send, based on the second set of CCEs, the second downlink control information carried on the PDCCH. In an aspect, the first set of CCEs are included in a first subframe and the second set of CCEs are included in a second subframe, the first set of CCEs included in the first subframe being in different locations than the second set of CCEs included in the second subframe.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
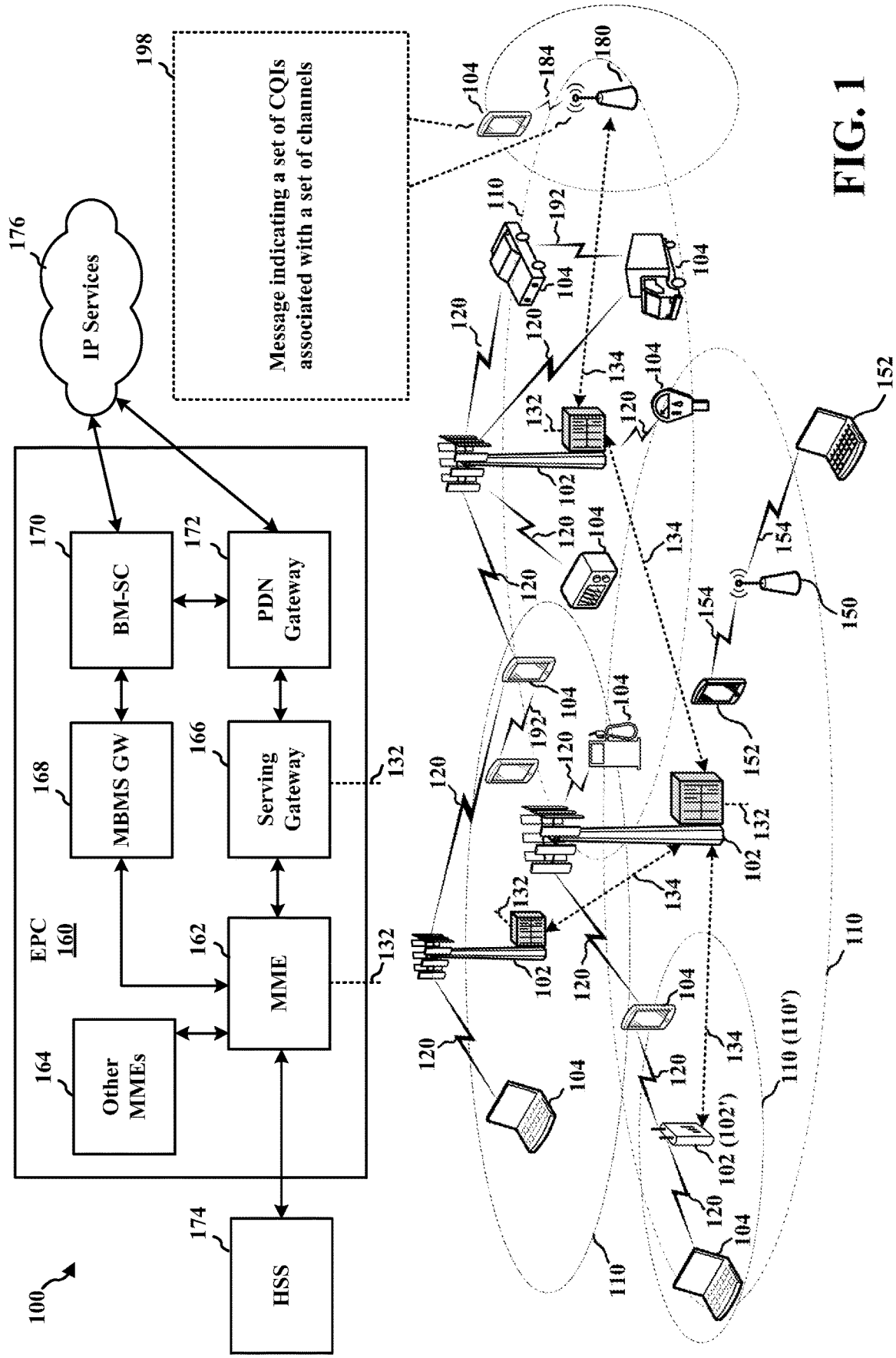
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may send, to the base station 102, a message 198 indicating a set of channel quality indicators (CQIs) associated with a set of channels. The UE 104 may monitor sets of control channel elements (CCEs) in a search space based on the set of channel quality indicators sent to the base station 102. The UE 104 may determine a plurality of channel qualities associated with a plurality of channels, and may select the set of channels from the plurality of channels based on the determined plurality of channel qualities. The UE 104 may receive control information associated with the UE 104 carried on a physical downlink control channel (PDCCH) based on the monitoring of the sets of CCEs in the UE-specific search space. In an aspect, the control information is further carried on the PDCCH in another set of CCEs in a common search space. In an aspect, the UE 104 may further receive, from the base station via radio resource control (RRC) signaling, information indicating the set of CCEs to monitor in the UE-specific search space and a common search space.

Correspondingly, the base station 102 may receive, from the UE 104, a message 198 indicating a set of CQIs associated with a set of channels. The base station 102 may receive, from a first UE 104, the message 198 indicating a set of CQIs associated with a set of channels. The base station 102 may determine, based on the received set of CQIs, a first set of CCEs for a UE-specific search space specific to the first UE 104 for receiving a PDCCH. The base station 102 may send, based on the determined first set of CCEs, downlink control information on the PDCCH in the UE-specific search space specific to the first UE 104. The base station 102 may send at least a portion of the downlink control information on the PDCCH in a common search space. The base station 102 may detect a collision between the first set of CCEs associated with the first UE 104 and a second set of CCEs associated with a second UE 104, wherein downlink control information associated with the second UE 104 is sent in the common search space based on the detected collision. The base station 102 may decode each CQI of the received set of CQIs, and detect a decoding failure associated with at least one CQI of the received set of CQIs, wherein the downlink control information carried on the PDCCH is sent in the common search space based on the detected decoding failure. In an aspect, the first set of CCEs is determined based on a plurality of received sets of CQIs, each set of CQIs associated with a respective subframe. The base station 102 may send, to the first UE 104 via RRC signaling, information indicating at least one of the first set of CCEs associated with the UE-specific search space specific to the first UE 104 or a second set of CCEs associated with a common search space, wherein the downlink control information carried on the PDCCH is carried on the at least one of the first set of CCEs or the second set of CCEs. The base station 102 may receive, from the first UE 104, a second set of CQIs associated with a second set of channels, determine, based on the second set of CQIs, a second set of CCEs for second downlink control information carried on the PDCCH, and send, based on the second set of CCEs, the second downlink control information carried on the PDCCH. In an aspect, the first set of CCEs are included in a first subframe and the second set of CCEs are included in a second subframe, the first set of CCEs included in the first subframe being in different locations than the second set of CCEs included in the second subframe.

Figure 2:
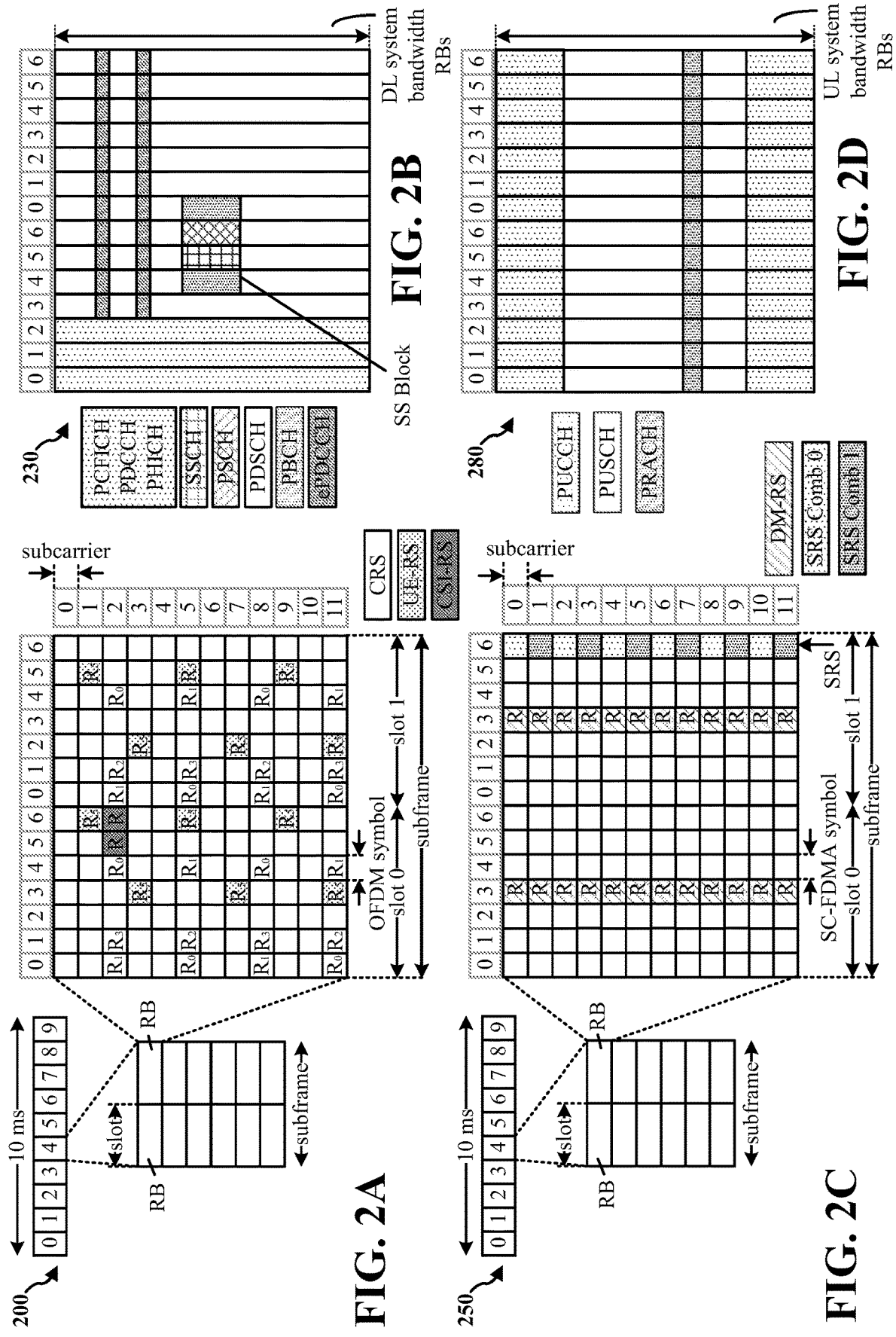
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the PDCCH occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a CQI, a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
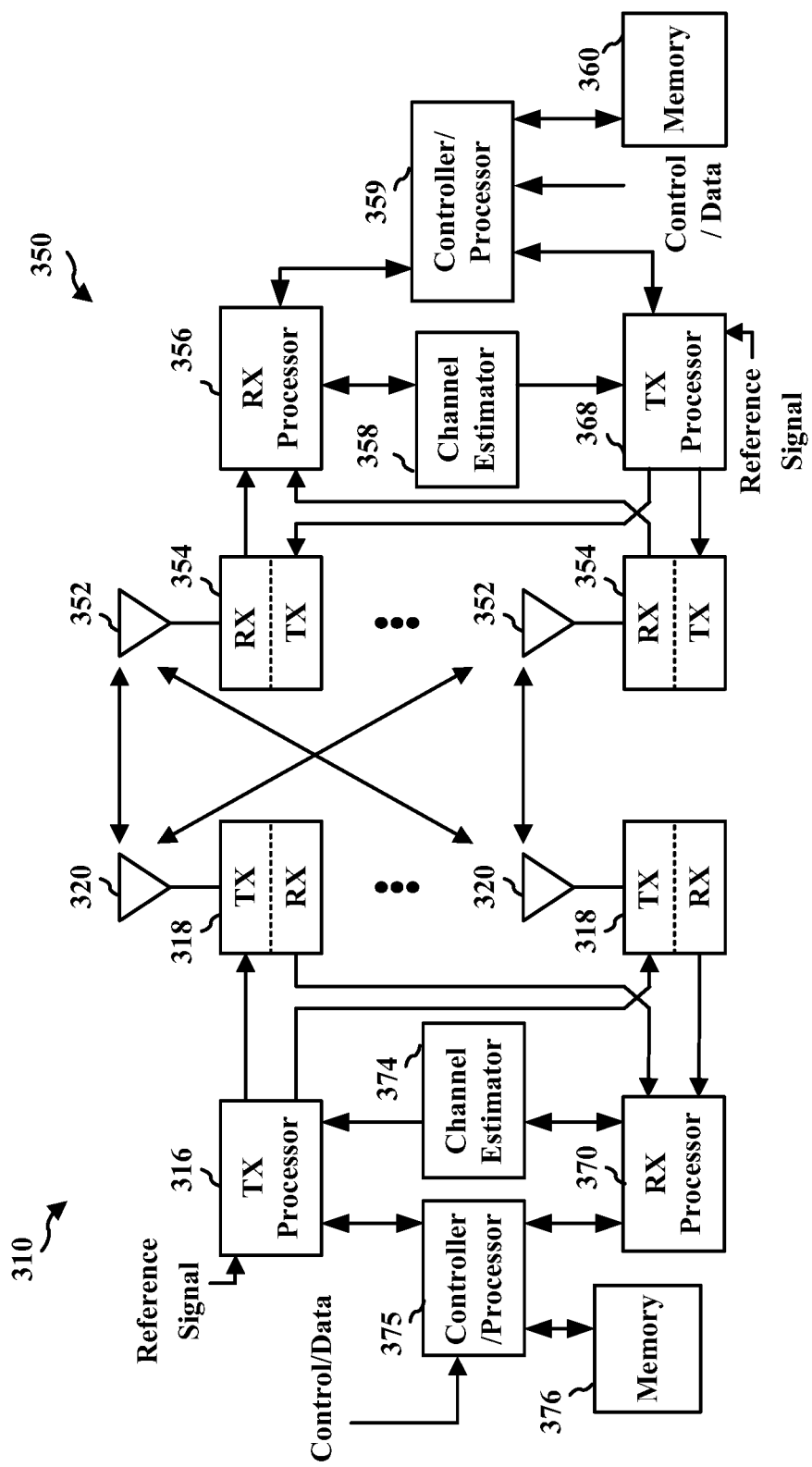
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a RRC layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
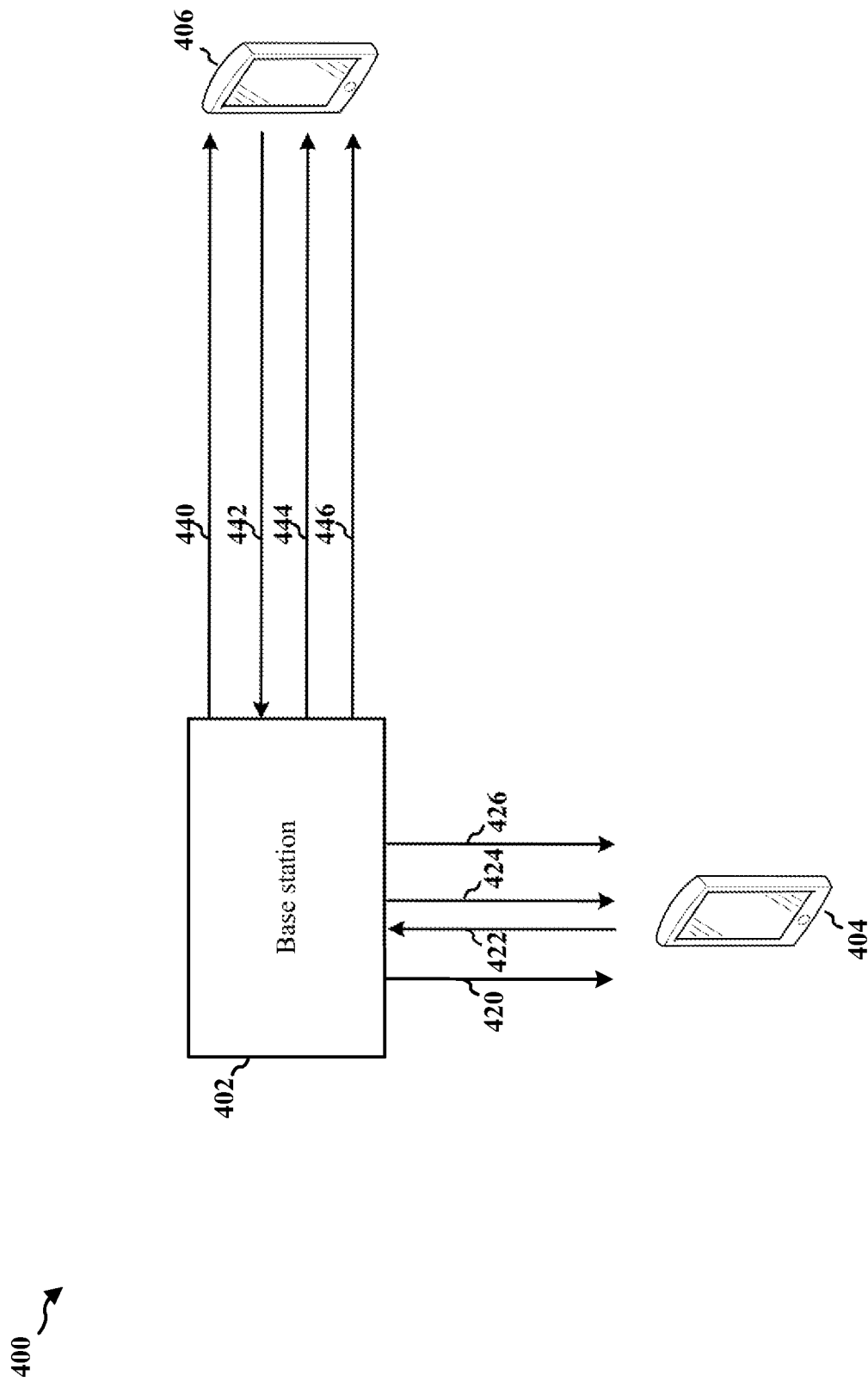
FIG. 4 is a diagram of a wireless communications system.

FIG. 4 is a diagram of a wireless communications system 400. The wireless communications system 400 may include a base station 402 and one or more UEs 404, 406. In aspects, the base station 402 may send control information for a UE 404 on a PDCCH. Each PDCCH may carry one DCI. Each PDCCH may be identified for a UE by a radio network temporary identifier (RNTI), and the RNTI may be implicitly encoded in a cyclic redundancy check (CRC) attachment of a DCI.

In various aspects, the base station 402 may communicate with a first UE 404 on a plurality of channels 420. The plurality of channels 420 may include a plurality of subbands that may carry information to the first UE 404. The first UE 404 may determine a plurality of channel qualities associated with the plurality of channels 420. For example, for each channel of the plurality of channels 420, the first UE 404 may measure at least one of a signal-to-noise ratio (SNR), a signal-to-noise-plus-interference ratio (SNIR), and/or a signal-to-noise-plus distortion ratio (SNDR). In an aspect the first UE 404 may receive, from the base station 402, a respective reference signal on a respective channel of the plurality of channels 420. For each reference signal corresponding to each channel, the first UE 404 may measure a SNR, SNIR, and/or SNDR, which may correspond to a channel quality. Accordingly, the first UE 404 may store a channel quality for each channel of the plurality of channels 420.

Based on the determined plurality of channel qualities, the first UE 404 may select a set of channels from the plurality of channels. For example, the first UE 404 may select a set of channels having a best or highest channel quality (e.g., a best SNR, a best SNIR, a best SNDR, etc.). The number of channels that is selected by the first UE 404 may be preconfigured in the first UE 404 (e.g., the first UE 404 may be configured to select the best five channels or the best ten channels). For example, the first UE 404 may select the best five or ten channels having a highest or best SNR, SNIR, or SNDR relative to the other channels, which are unselected.

The first UE 404 may determine CQIs for the set of selected channels. A CQI may be a value that indicates a channel quality, such as an value (e.g., integer or other indicator value) that represents at least one of an SNR, an SNIR, or an SNDR. The first UE 404 may then send the set of CQIs 422 associated with the set of selected channels to the base station 402.

The base station 402 may receive and decode the set of CQIs 422 from the first UE 404 in order to determine the CQIs corresponding to the set of channels selected by the first UE 404. Based on the set of CQIs 422, the base station 402 may determine a first set of CCEs for a PDCCH for receiving downlink control information by the first UE 404. For example, the base station 402 may form a search space, including the first set of CCEs, to carry the PDCCH for the first UE 404 based on one or more channels corresponding to one or more CQIs in the set of CQIs 422. The base station 402 may form the search space dynamically (e.g., from subframe to subframe) or semi-statically.

The search space may be a new search space—e.g., the search space may be different from a previous search space used for the first UE 404 or the search space may be the first search space formed for the first UE 404. The search space may include both a UE-specific search space and a common search space. For example, a UE-specific search space may include at least a portion of the first set of CCEs in which the downlink control information for the first UE 404 and carried on a PDCCH may be found. A common search space may include a set of CCEs that is common to all UEs 404, 406 in a coverage area; however, the common search space may carry downlink control information specific to a UE (e.g., the first UE 404) on a PDCCH.

In aspects, the base station 402 may determine one or more CCEs corresponding to one or more channels indicated by the CQIs in the set of CQIs 422 (see, e.g., FIG. 2B, supra). The base station 402 may attempt to schedule the downlink control information on a PDCCH in the UE-specific search space on CCEs corresponding to those channels. Accordingly, the base station 402 may select a set of CCEs associated with a UE-specific search space based on the received set of CQIs 422.

In one aspect, the base station 402 may select a set of CCEs associated with the UE-specific search space based on a plurality of sets of CQIs (including the set of CQIs 422). That is, the base station 402 may select a set of CCEs based on CQIs received in one or more previous subframes. For example, the base station 402 may select CCEs for a search space based on channel(s) that have been indicated as having a good CQI for more than one subframe.

In a further aspect, the base station 402 may select CCEs based on characteristics associated with a channel and/or characteristics associated with content to be carried on a channel. For example, a channel corresponding to a CQI in the received set of CQIs 422 may be associated with traffic for the first UE 404. For example, the first UE 404 may be associated with traffic having a higher priority relative to traffic associated with the second UE 406—e.g., the traffic associated with the first UE 404 may be mission-critical traffic. Accordingly, the base station 402 may prioritize scheduling CCEs for a search space for the first UE 404 over scheduling CCEs for a search space for the second UE 406.

In an aspect, the base station 402 may determine an aggregation level for the set of CCEs. The aggregation level may refer to the number of CCEs for a PDCCH. The aggregation level may be 1, 2, 4, or 8 consecutive CCEs (e.g., consecutive in a logical sequence). The base station 402 may determine the aggregation level based on, for example, a DCI format, a system bandwidth, or another factor. In one aspect, the base station 402 may determine an aggregation level based on the set of CQIs 422. For example, if a CQI in the set of CQIs 422 is relatively low (e.g., compared to a threshold), then the base station 402 may determine that a higher aggregation level should be used (e.g., 4 or 8).

In an aspect, the base station 402 may send downlink control information for the first UE 404 on a PDCCH in a common search space (e.g., in addition to sending downlink control information for the first UE 404 on a PDCCH in a UE-specific search space). At least a portion of the common search space may include control information that is common to all UEs 404, 406 in coverage area of the base station. However, the base station 402 may include UE-specific control information in a portion of the common search space, as well. The common search space may be pre-defined. The base station 402 may transmit information indicating a set of CCEs associated with the common search space to the UEs 404, 406 via RRC signaling.

When decoding the set of CQIs 422, the base station 402 may detect a decoding failure associated with at least one CQI of the set of CQIs 422. Consequently, the base station 402 may be unable to determine at least one channel having a best or highest quality as measured by the first UE 404. Based on the detected decoding failure, the base station 402 may schedule downlink control information on a PDCCH for the first UE 404 in the common search space. That is, the base station 402 may be unable to determine which channel (s) have a best or highest channel quality as measured by the first UE 404 because the base station 402 may be unable to decode CQI(s) corresponding to that channel(s). Therefore, the base station 402 may schedule control information for the first UE 404 in the common search space, instead of a UE-specific search space.

In one aspect, the base station 402 may detect a collision between CCE assignments for the UEs 404, 406. For example, a second UE 406 may report a second set of CQIs 442 associated with a set of channels, which may be selected from a plurality of channels 440 received by the second UE 406. The second set of CQIs 442 reported by the second UE 406 may cause a collision (e.g., overlap) of CCE assignments when the base station 402 attempts to schedule the PDCCH for the first UE 404 based on the first set of CQIs 422 (e.g., the base station 402 is unable to orthogonally schedule the respective PDCCHs for the UEs 404, 406). Therefore, the base station 402 may schedule a PDCCH for the first UE 404 in a common search space if a collision between CCE assignments occurs based on the first set of CQIs 422 and the second set of CQIs 442.

When the base station 402 schedules the PDCCH for the first UE 404, the base station 402 may send, to the first UE 404, information 424 indicating sets of CCEs to monitor in the UE-specific search space and the common search space. This information 424 may indicate where (e.g., at which CCEs and/or which aggregation level) a PDCCH carrying control information for the first UE 404 is located. The base station 402 may send this information 424 to the first UE 404 via RRC signaling.

The first UE 404 may monitor sets of CCEs based on the information 424 indicating the sets of CCEs to monitor, which is based on the set of CQIs 422. In effect, the first UE 404 may monitor the sets of CCEs in the UE-specific search space and the common search space based on the set of CQIs 422 sent to the base station 402. The first UE 404 may monitor sets of CCEs based on the information 424 at different aggregation levels (e.g., 1, 2, 4, and/or 8)

The base station 402 may then send control information 426 on a PDCCH in a UE-specific search space and/or a common search space. The first UE 404 may be monitoring the sets of CCEs associated with the UE-specific search space and the common search space and, therefore, the first UE 404 may receive the control information 426 carried on the PDCCH based on monitoring sets of CCEs in the UE-specific search space and the common search space. Thus, given the information 424 indicating the search space, the first UE 404 may monitor sets of CCEs (e.g., sets of CCEs for different aggregation levels) in both the UE-specific search space and the common search space to receive the PDCCH.

Similar to operations described with respect to the first UE 404, the base station 402 may send, via RRC signaling, information 444 indicating sets of CCEs that the second UE 406 is to monitor in a UE-specific search space and a common search space. The base station 402 may then send control information 446 that is carried on a PDCCH in the UE-specific search space and the common search space. However, the UE-specific search space may be different (e.g., the base station 402 may determine a different aggregation level) for the second UE 406.

In an aspect, the base station 402 may form a new search space for the first UE 404. For example, the search space for the UE 404 (which may include CCEs in both a UE-specific search space and a common search space) may not be fixed for the first UE 404, but may be dynamically allocated by the base station 402. In one aspect, the base station 402 may receive another set of CQIs from the first UE 404 (e.g., similar to the set of CQIs 422). The other set of CQIs may include one or more CQIs corresponding to one or more channels that did not correspond to any CQIs in the set of CQIs 422. Based on the other set of CQIs, the base station 402 may select a next set of CCEs for a new search space for the first UE 404. The next set of CCEs may be included in a subsequent subframe that follows a subframe in which the first set of CCEs is included. Accordingly, a search space for the first UE 404 may be different in different subframes.

Figure 5:
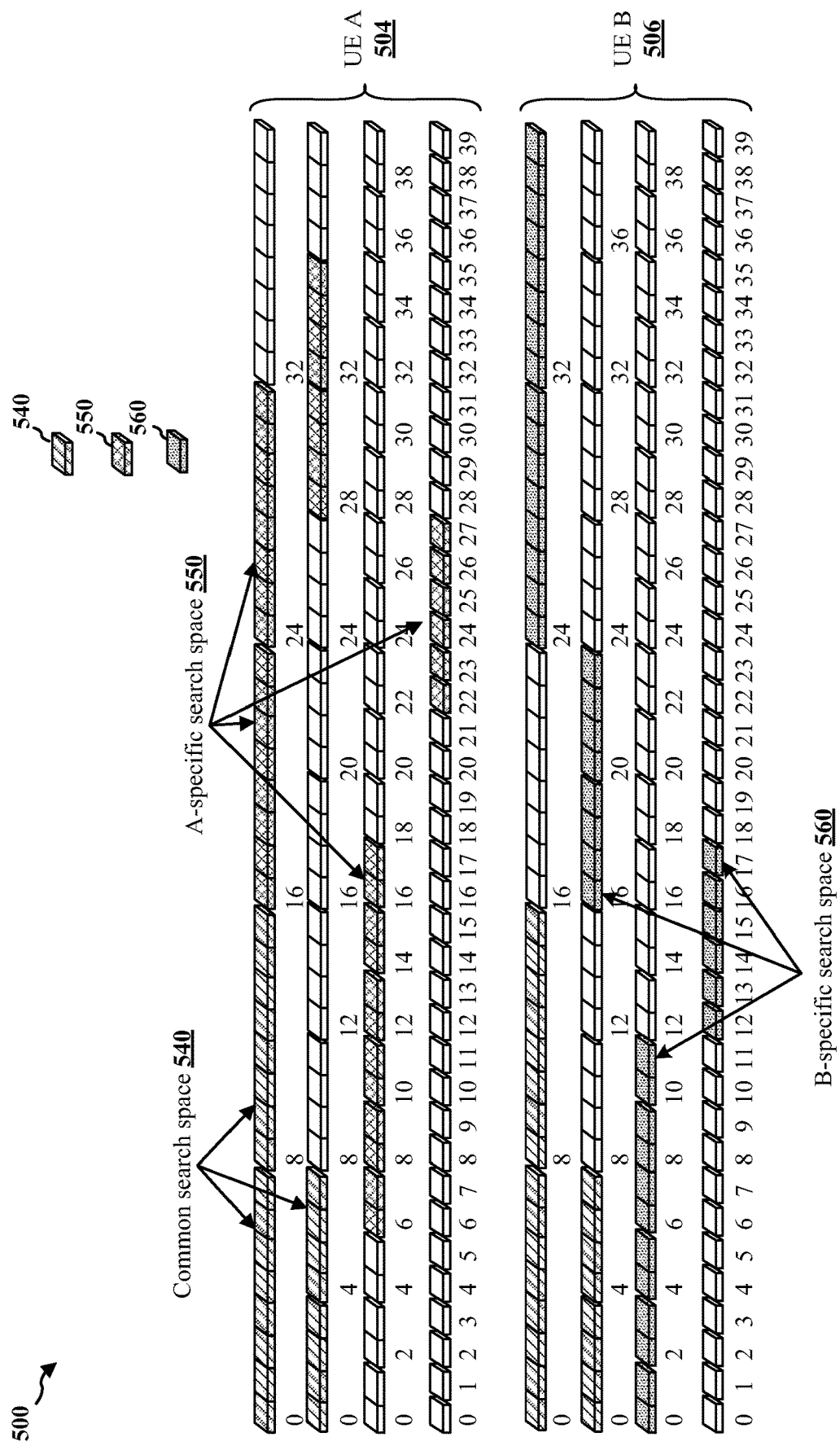
FIG. 5 is a diagram of control channel elements.

FIG. 5 illustrates a diagram of CCE assignments according to an aspect. A base station (e.g., the base station 402) may assign CCEs to UEs (e.g., the UEs 404, 406). Thus, a wireless communication environment may include a first CCE assignment 504 associated with a first UE (e.g., the first UE 404) and a second CCE assignment 506 associated with a second UE (e.g., the second UE 406).

CCE assignments 504, 506 may include search spaces 540, 550, 560 that indicate the CCE locations at which a UE may detect downlink control information for the UE carried on a PDCCH. The common search space 540 may be the same across various CCE assignments 504, 506 and may include control information that is common across UEs. However, the common search space 540 may also carry control information that is specific to a UE. The CCE assignment for the common search space 540 may be signaled to all UEs in a coverage area via RRC signaling.

CCE assignments 504, 506 may include UE-specific search spaces 550, 560. That is, the first CCE assignment 504 may include a search space 550 that is specific to a first UE (e.g., the first UE 404) and the second CCE assignment 506 may include a search space 560 that is specific to a second UE (e.g., the second UE 406). Further, there may be overlap between the common search space 540 and a UE-specific search space 550, 560.

A first UE (e.g., the UE 404) may monitor both the common search space 540 and the UE-specific search space 550. The first UE may monitor sets of CCEs according to aggregation levels (e.g., 1, 2, 4, 8).

According to various wireless standards (e.g., LTE, 5G NR, etc.), a search space may be UE-ID dependent and semi-persistent. That is, the UE-specific search space may be assigned as long as an association between UE and base station is established. For a UE with a weak link (e.g., as indicated to the base station by a received set of CQIs), the base station may select a relatively high aggregation level (e.g., aggregation level 8) for CCEs in a PDCCH. However, the preassigned level-8 CCEs may experience fading and, consequently, the PDCCH carried thereon may not be received by a UE. Accordingly, a base station that adjusts a search space may improve reception of a PDCCH.

According to various aspects, the first UE may determine channel qualities for a plurality of channels sent by a base station. The first UE may select a set of channels from the plurality of channels based on the determined channel qualities—e.g., the first UE may select the best five or ten channels. The first UE may send a set of CQIs associated with the set of selected channels to the base station. The base station may select a set of CCEs to carry the PDCCH for the first UE. The base station may dynamically select CCEs for a UE-specific search space dynamically—e.g., the first UE-specific search space 550 may be different in different subframes.

In the context of FIG. 4, the base station 402 may form the search space for the first UE 404 based on a set of CQIs 422 received from the first UE 404. The search space formed for the first UE 404 may be the first CCE assignment 504 and may include the CCEs in the first UE-specific search space 550 as well as one or more CCEs in the common search space 540. The base station 402 may signal information 424 to the first UE 404 that indicates the first CCE assignment 504 so that the first UE 404 knows which CCEs to monitor in order to detect downlink control information carried on a PDCCH. The base station 402 may then send control information 426 on CCEs in the first UE-specific search space 550 and the common search space 540 for the first UE 404.

Similarly, the base station 402 may form the search space for the second UE 406 based on a set of CQIs 442 received from the second UE 406. The search space formed for the second UE 406 may be the second CCE assignment 506 and may include the CCEs in the second UE-specific search space 560 as well as one or more CCEs in the common search space 540. The base station 402 may signal information 444 to the second UE 406 that indicates the second CCE assignment 506 so that the second UE 406 knows which CCEs to monitor in order to detect downlink control information for the second UE 406 carried on a PDCCH. The base station 402 may then send control information 446 on CCEs in the second UE-specific search space 560 and the common search space 540 for the second UE 406.

Figure 6:
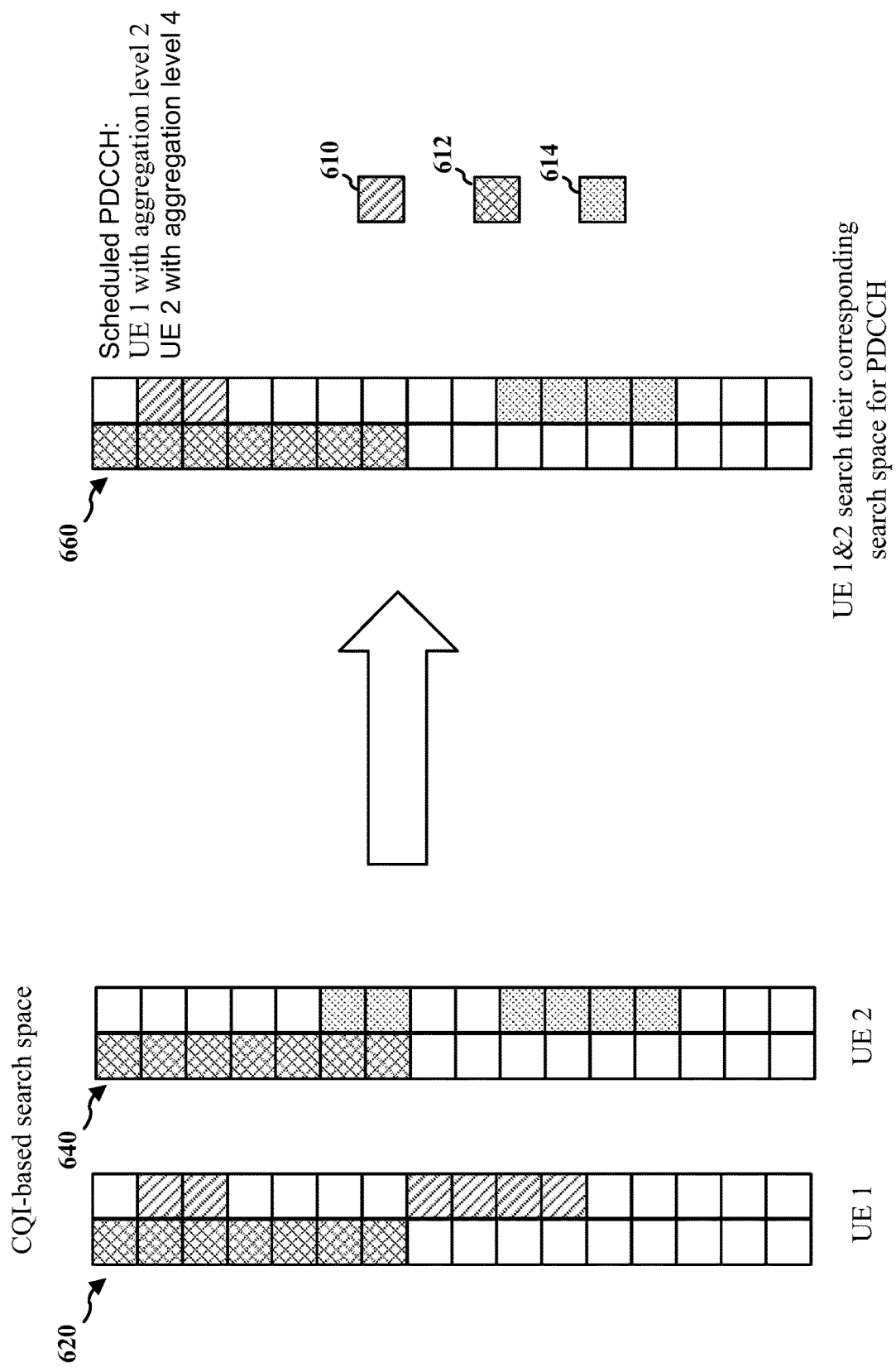
FIG. 6 is a diagram of control channel elements.

FIG. 6 illustrates a CQI-based search space, according to an aspect. In FIG. 6, a first UE (e.g., the first UE 404) may receive a first set of CCEs 620. The CCEs 620 may include a common search space on a set of CCEs 610. The first UE may determine a set of CQIs associated with a set of channels that correspond to CCEs 612. The first UE may send, to a base station (e.g., the base station 402), a set of CQIs associated with channels corresponding to those CCEs 612.

Similar to the first UE, a second UE (e.g., the second UE 406) may receive a second set of CCEs 640. The CCEs 640 may include a common search space on a set of CCEs 610. The second UE may determine a set of CQIs associated with a set of channels that correspond to CCEs 614. The second UE may send, to a base station (e.g., the base station 402), a set of CQIs associated with channels corresponding to those CCEs 614.

The base station may schedule downlink control information on a PDCCH for the first UE and schedule downlink control information on a PDCCH for the second UE in a third set of CCEs 660. The base station may schedule the first UE with an aggregation level of 2. The PDCCH for the first UE may occur on CCEs 612 that correspond to CQIs sent to the base station by the first UE. If necessary (e.g., due to CQI decoding failure or scheduling collision), the base station may schedule the downlink control information carried on the PDCCH for the first UE in the CCEs 610 associated with the common search space.

The base station may schedule the second UE with an aggregation level of 4. The downlink control information carried on the PDCCH for the second UE may occur on CCEs 614 that correspond to CQIs sent to the base station by the second UE. If necessary (e.g., due to CQI decoding failure or scheduling collision), the base station may schedule the downlink control information carried on the PDCCH for the second UE in the CCEs 610 associated with the common search space.

The base station may send, to the first UE, information indicating the location of the CCEs 612 where the first UE may detect downlink control information carried on the PDCCH. Based on this information, the first UE may monitor sets of CCEs. While the first UE may monitor all aggregation levels, the first UE may find the PDCCH at the set of CCEs 612 having an aggregation level 2. Similarly, the base station may send, to the second UE, information indicating the location of the CCEs 614 where the second UE may find the PDCCH. Based on this information, the second UE may monitor sets of CCEs. While the second UE may monitor all aggregation levels, the second UE may detect downlink control information carried on t PDCCH at the set of CCEs 614 having an aggregation level 4. Both the first UE and the second UE may monitor the sets of CCEs 660 from the base station in order to find a PDCCH.

Figure 7:
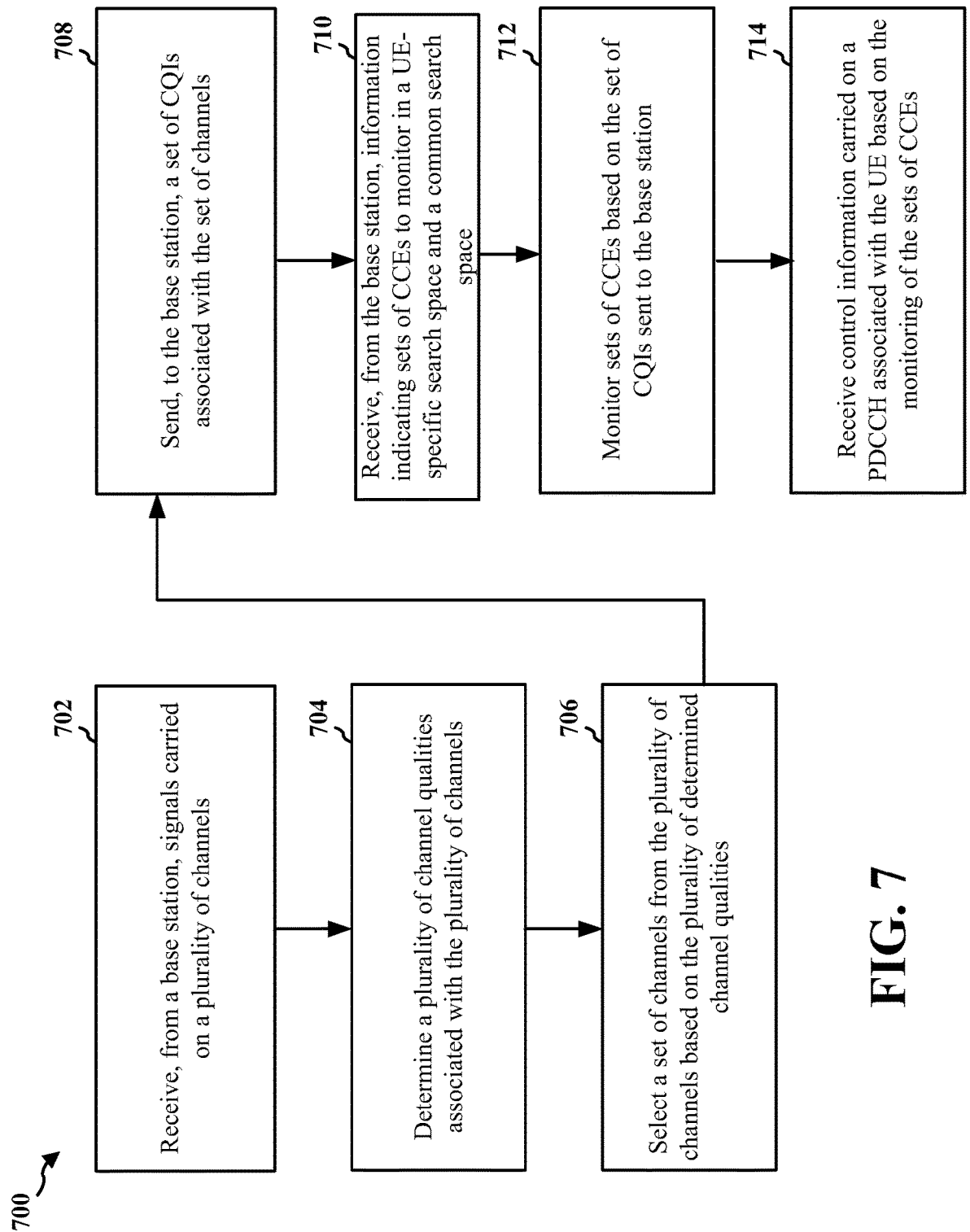
FIG. 7 is a flowchart of a method of wireless communication.

FIG. 7 is a flowchart of a method 700 of wireless communication. The method may be performed by a UE (e.g., the first UE 404, the apparatus 902/902'). In different aspects, one or more operations may be added, transposed, omitted, or contemporaneously performed.

At 702, the UE may receive, from a base station, signals carried on a plurality of channels. For example, the UE may receive a respective reference signal that is carried on a respective channel of the plurality of channels. The UE may identify each reference signal as corresponding to a respective channel on which the reference signal is carried. In the context of FIG. 4, the first UE 404 may receive the plurality of channels 420 from the base station 402. By way of example, FIG. 6 illustrates a first set of CCEs 620 that may be included in a plurality of channels and that may be received by a first UE.

At operation 704, the UE may determine a plurality of channels qualities associated with the plurality of channels. For example, the UE may measure at least one metric value (e.g., SNR, SNIR, SNDR) for each reference signal of the plurality of reference signals carried on the plurality of channels. The UE may determine a respective channel quality for a respective channel of the plurality of channels as the measured at least one metric value for a respective reference signal corresponding to that respective channel. In the context of FIG. 4, the first UE 404 may determine a plurality of channel qualities based on the plurality of channels 420 received from the base station 402. By way of example, FIG. 6 illustrates CCEs that may correspond to a plurality of channels for which a UE may measure channel qualities (e.g., SNRs, SNIRs, SNDRs).

At operation 706, the UE may select a set of channels from the plurality of channels based on the plurality of determined channel qualities. For example, the UE may compare metric values corresponding to channels to one another to identify the best or highest metric values. The UE may then select a predetermined number (e.g., five or ten) of the channels having the best or highest measured metric values—e.g., the UE may select five or ten channels having the best or highest SNR, SNIR, and/or SNDR as the set of channels. In the context of FIG. 4, the first UE 404 may select, from the plurality of channels 420, a set of channels based on the channel qualities determined for the plurality of channels 420. By way of example, FIG. 6 illustrates a subset of CCEs 612 that correspond to channels that may be selected by a first UE based on determined channel qualities.

At operation 708, the UE may send, to the base station, a set of CQIs associated with the set of channels. For example, the UE may determine a respective CQI based on a respective channel quality determined for a respect channel. The UE may then send CQIs for the best channels (e.g., the selected best five or ten channels) to the base station. In the context of FIG. 4, the first UE 404 may send, to the base station 402, the set of CQIs 422 associated with the set of selected channels. By way of example, FIG. 6 illustrates a subset of CCEs 612 that may correspond to channels that may be indicated by a first UE to a base station.

At operation 710, the UE may receive, from the base station, information indicating sets of CCEs to monitor in a UE-specific search space and a common search space so that the UE may detect downlink control information carried on a PDCCH. The UE may receive this information via RRC signaling. For example, the UE may receive a message indicating one or more CCEs (e.g., nine continuous REGs) that may carry downlink control information on a PDCCH for the UE. In the context of FIG. 4, the first UE 404 may receive, from the base station 402 via RRC signaling, the information 424 indicating sets of CCEs to monitor in a UE-specific search space and a common search space. By way of example, FIG. 5 illustrates a first CCE assignment 504 that includes a first UE-specific search space 550 and a common search space 540 and a second CCE assignment 506 that includes a second UE-specific search space 560 and a common search space 540. In a further example, FIG. 6 illustrates a third set of CCEs 660 including a set of CCEs 612 corresponding to a UE-specific search space and a set of CCEs 614 corresponding to a common search space. A UE may receive information indicating the set of CCEs 612 corresponding to a UE-specific search space and the set of CCEs 614 corresponding to a common search space.

At operation 712, the UE may monitor sets of CCEs. The UE may monitor sets of CCEs based on the received information indicating the sets of CCEs to monitor. Because the received information indicating sets of CCEs to monitor may be based on the set of CQIs sent to the base station, the UE may monitor sets of CCEs based on the set of CQIs sent to the base station. In one aspect, the UE may identify one or more CCEs indicated by the received information. The UE may detect DCI carried on a PDCCH on the one or more CCEs, for example, according to an aggregation level (e.g., 1, 2, 4, or 8). The UE may identify an RNTI indicated by the DCI, and the RNTI may indicate the UE for which the downlink control information carried on the PDCCH is intended. In the context of FIG. 4, the first UE 404 may monitor sets of CCEs from the base station 402. By way of example, FIG. 5 illustrates a first CCE assignment 504 that a first UE may monitor (e.g., a first UE-specific search space 550 and a common search space 540) and a second CCE assignment 506 that a second UE may monitor (e.g., a second UE-specific search space 560 and a common search space 540). In a further example, FIG. 6 illustrates a third set of CCEs 660 including a set of CCEs 612 corresponding to a UE-specific search space and a set of CCEs 614 corresponding to a common search space. A UE may monitor this third set of CCEs 660 based on information indicating the set of CCEs 612 corresponding to a UE-specific search space and the set of CCEs 614 corresponding to a common search space.

At operation 714, the UE may receive control information associated with the UE and carried on a PDCCH based on the monitoring of the sets of CCEs. For example, the UE may determine that a DCI carried on a PDCCH on one or more CCEs indicates an RNTI associated with the UE. Based on the determination that the RNTI is associated with the UE, the UE may determine that the DCI carried on the PDCCH is intended for the UE. In the context of FIG. 4, the first UE 404 may receive the control information 426 carried on a PDCCH. By way of example, FIG. 5 illustrates a first CCE assignment 504 in which a first UE may receive control information carried on a PDCCH in at least one of a UE-specific search space or a common search space (e.g., a PDCCH in a first UE-specific search space 550 and/or a PDCCH in a common search space 540) and a second CCE assignment 506 in which a second UE may receive control information associated with the second UE carried on a PDCCH in at least one of a UE-specific search space or a common search space (e.g., a PDCCH in a second UE-specific search space 560 and/or a PDCCH in a common search space 540). In a further example, FIG. 6 illustrates a third set of CCEs 660 including a set of CCEs 612 corresponding to a UE-specific search space and a set of CCEs 614 corresponding to a common search space. A UE may receive downlink control information associated with the UE and carried on a PDCCH on the set of CCEs 612 corresponding to a UE-specific search space and/or the set of CCEs 614 corresponding to a common search space.

Figure 8:
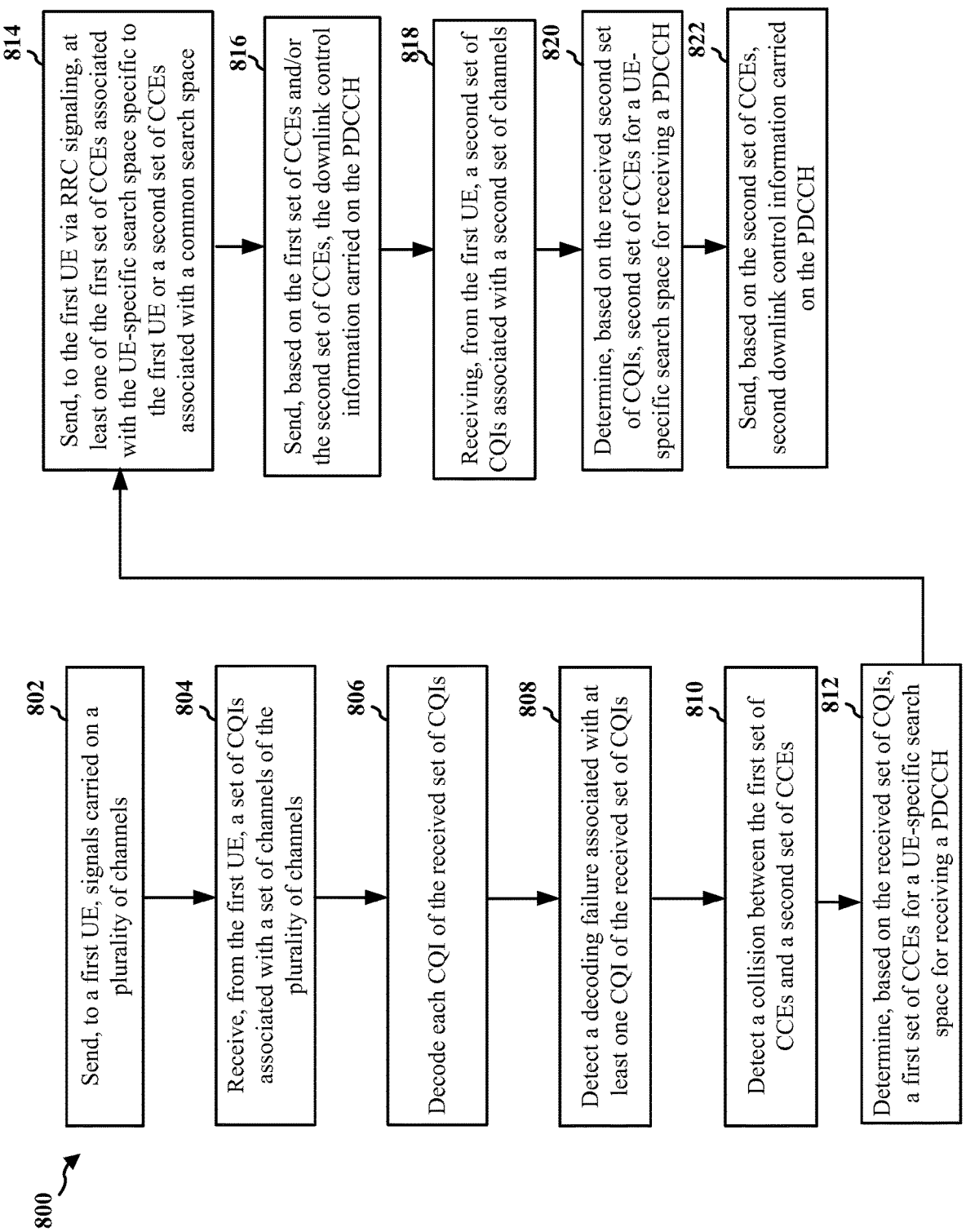
FIG. 8 is a flowchart of a method of wireless communication.

FIG. 8 is a flowchart of a method 800 of wireless communication. The method may be performed by a base station (e.g., the base station 402, the apparatus 1102/1102'). In different aspects, one or more operations may be added, transposed, omitted, or contemporaneously performed.

At 802, the base station may send, to a first UE, signals carried on a plurality of channels. For example, the base station may generate at least one reference signal. The first UE may then sent the at least one reference signal on each channel of the plurality of channels. In the context of FIG. 4, the base station 402 may send, to first UE 404, signals on the plurality of channels 420. By way of example, FIG. 6 illustrates a first set of CCEs 620 that may correspond to a plurality of channels and that may be transmitted by a base station.

At operation 804, the base station may receive, from the first UE, a set of CQIs associated with a set of channels. The set of channels may be a subset of the plurality of channels on which the signals are carried. For example, the base station may receive and decode the set of CQIs. The base station may then identify one or more respective channel(s) that corresponds to a respective CQI(s) of the set of CQIs.

In the context of FIG. 4, the base station 402 may receive, from the first UE 404, the set of CQIs 422 associated with the set of selected channels. By way of example, FIG. 6 illustrates a subset of CCEs 612 that may correspond to channels that may be indicated by a base station by a UE as a set of CQIs.

At operation 806, the base station may decode each CQI of the received set of CQIs. For example, the base station may detect encoded information received from the UE, and the base station may decode the detected encoded information. In the context of FIG. 4, the base station 402 may decode each CQI of the received set of CQIs 422.

At operation 808, the base station may detect a decoding failure associated with at least one CQI of the received set of CQIs. For example, the base station may attempt to decode each CQI of the received set of CQIs. When attempting to decode a respective CQI, the base station may detect a CRC or block error rate (BLER) that indicates a decoding failure of the respective CQI. In the context of FIG. 4, the base station 402 may detect a decoding failure of at least one CQI included in the set of CQIs.

At operation 810, the base station may detect a collision between CCE assignments. For example, the base station may identify at least one CCE corresponding to a channel that corresponds to a CQI of the received set of CQIs. The base station may attempt to schedule a PDCCH for the first UE in a UE-specific search space in the identified at least one CCE. However, the base station may determine that the at least one identified CCE is already assigned to a different UE-specific search space for a different UE. In the context of FIG. 4, the base station 402 may detect a collision between CCE assignments for the first UE 404 and the second UE.

At operation 812, the base station may determine, based on the received set of CQIs, a first set of CCEs for a UE-specific search space for receiving a PDCCH for receiving downlink control information by the first UE. For example, the base station may identify one or more CCEs corresponding to one or more channels that correspond to a respective CQI in the received set of CQIs. The base station may schedule downlink control information for the first UE on a PDCCH in a UE-specific search space based on the received set of CQIs. In another example, the base station may schedule the PDCCH for the first UE in a common search space, e.g., based on a detected collision between CCE assignments (as illustrated at operation 808) and/or a detected decoding failure (as illustrated at operation 810).

In the context of FIG. 4, the base station 402 may determine, based on the received set of CQIs 422, a first set of CCEs for a UE-specific search space for PDCCH for receiving downlink control information by the first UE 404. By way of example, FIG. 5 illustrates a first CCE assignment 504 that includes a first UE-specific search space 550 and a common search space 540 and a second CCE assignment 506 that includes a second UE-specific search space 560 and a common search space 540. The base station may determine the first CCE assignment 504 based on at least the received set of CQIs and may determine the second CCE assignment based on at least another set of CQIs received from another UE. In a further example, FIG. 6 illustrates a third set of CCEs 660 including a set of CCEs 612 corresponding to a UE-specific search space and a set of CCEs 614 corresponding to a common search space. A base station may determine the set of CCEs 612 corresponding to a UE-specific search space and the set of CCEs 614 corresponding to a common search space based on a set of CQIs.

At operation 814, the base station may send, to the first UE, information indicating at least one of the first set of CCEs associated with the UE-specific search space specific to the first UE or a second set of CCEs associated with a common search space. For example, the base station may generate a message indicating one or more CCEs that the first UE is to monitor in order to find downlink control information for the first UE carried on a PDCCH. The base station may transmit this generated message to the first UE. The base station may send this information via RRC signaling.

In the context of FIG. 4, the base station 402 may send the information 424 indicating sets of CCEs to monitor in a UE-specific search space and a common search space. By way of example, FIG. 5 illustrates a first CCE assignment 504 that includes a first UE-specific search space 550 and a common search space 540 and a second CCE assignment 506 that includes a second UE-specific search space 560 and a common search space 540. The base station may send, to a first UE, information indicating the first CCE assignment 504 and may send, to a second UE, information indicating the second CCE assignment. In a further example, FIG. 6 illustrates a third set of CCEs 660 including a set of CCEs 612 corresponding to a UE-specific search space and a set of CCEs 614 corresponding to a common search space. A base station may transmit, to a UE, information indicating the set of CCEs 612 corresponding to a UE-specific search space and the set of CCEs 614 corresponding to a common search space.

At operation 816, the base station may send, based on the determined first set of CCEs, control information on a PDCCH for receiving downlink control information by the first UE in a search space specific to the first UE. For example, the base station may determine or identify control information that is to be communicated to the first UE. The base station may schedule the control information associated with the first UE and to be carried on a PDCCH. The base station may schedule the PDCCH on the determined first set of CCEs, which may correspond to a search space specific to the first UE and/or a common search space.

In the context of FIG. 4, the base station 402 may send, to the first UE 404, the control information 426 carried on a PDCCH based on the determined first set of CCEs. By way of example, FIG. 5 illustrates a first CCE assignment 504 in which a transmit a PDCCH for receiving downlink control information by a first UE (e.g., a PDCCH in a first UE-specific search space 550 and/or a PDCCH in a common search space 540) and a second CCE assignment 506 in which the base station may transmit a PDCCH for receiving downlink control information by a second UE (e.g., a PDCCH in a second UE-specific search space 560 and/or a PDCCH in a common search space 540). In a further example, FIG. 6 illustrates a third set of CCEs 660 including a set of CCEs 612 corresponding to a UE-specific search space and a set of CCEs 614 corresponding to a common search space. A base station may transmit control information on a PDCCH for receiving downlink control information by the first UE on the set of CCEs 612 corresponding to a UE-specific search space and the set of CCEs 614 corresponding to a common search space.

At operation 818, the base station may receive, from the first UE, a second set of CQIs associated with a second set of channels. For example, the base station may receive another set of CQIs indicating one or more different channels after sending the downlink control information. In the context of FIG. 4, the base station 402 may receive, from the first UE 404, a second set of CQIs associated with a second set of channels.

At operation 820, the base station may determine, based on the second set of CQIs, a second set of CCEs for second downlink control information carried on the PDCCH. For example, the base station may identify one or more CCEs corresponding to one or more channels that correspond to a respective CQI in the received second set of CQIs. The base station may schedule subsequent downlink control information for the first UE on a PDCCH in a UE-specific search space based on the received second set of CQIs. In other words, the base station may dynamically update the CCEs of a search space for receiving a PDCCH by a UE. In the context of FIG. 4, the base station 402 may determine, based on the second set of CQIs, a second set of CCEs for second downlink control information carried on the PDCCH.

At operation 822, the base station may send, based on the determined second set of CCEs, control information on a PDCCH for receiving downlink control information by the first UE in a search space specific to the first UE. For example, the base station may determine or identify control information that is to be communicated to the first UE. The base station may schedule the control information associated with the first UE and to be carried on a PDCCH. The base station may schedule the PDCCH on the determined second set of CCEs, which may correspond to a search space specific to the first UE and/or a common search space. In the context of FIG. 4, the base station 402 may send, to the first UE 404, the control information 426 carried on a PDCCH based on the determined second set of CCEs.

Figure 9:
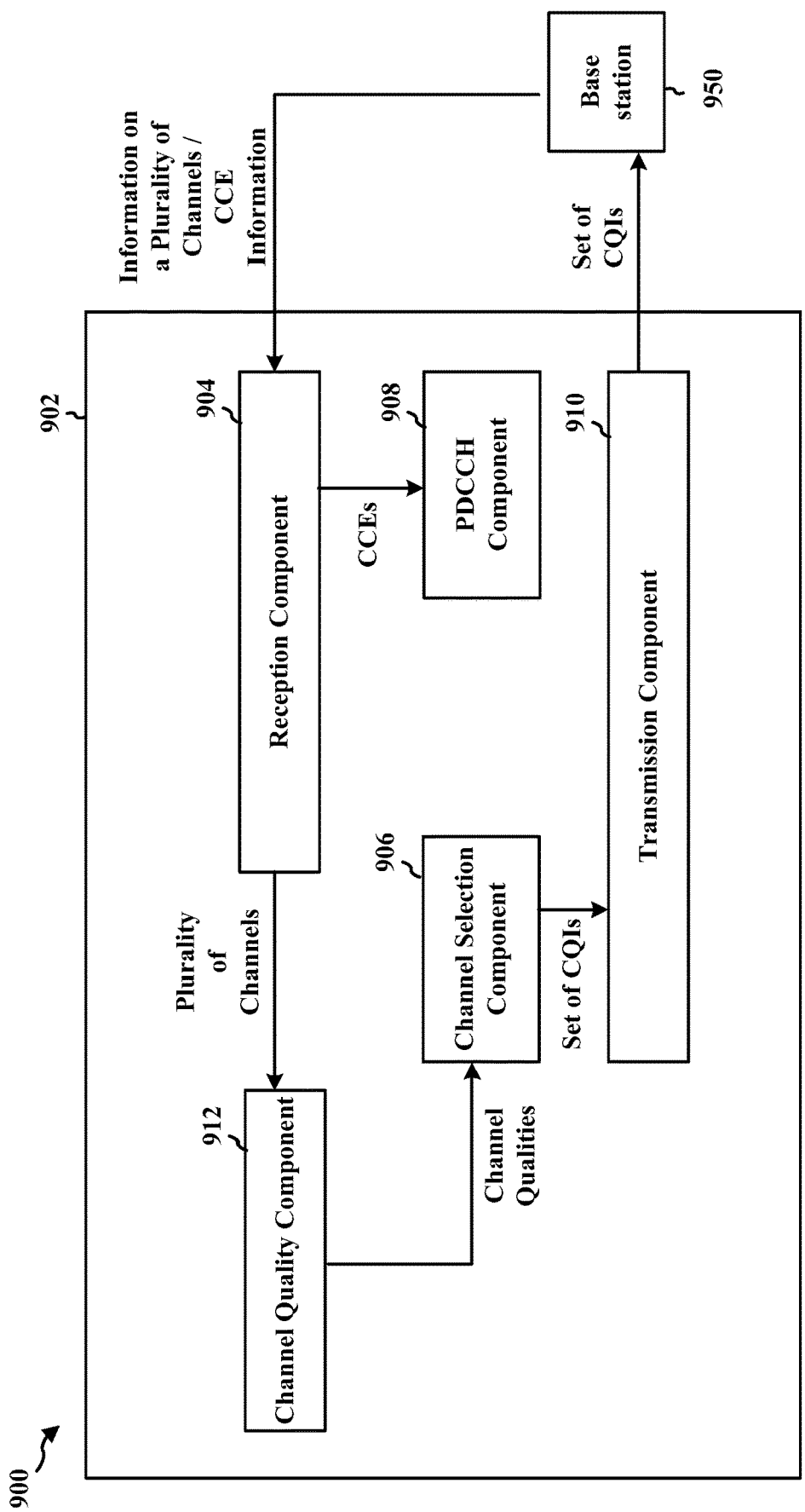
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus may be a UE. The illustrated components and/or data flow are illustrative and the apparatus 902 may include additional and/or other components and/or data flow.

The apparatus 902 may include a transmission component 910 configured to transmit signals to a base station (e.g., the base station 950). The apparatus 902 may include a reception component 904 configured to receive signals from a base station (e.g., the base station 950).

The apparatus 902 may include a channel quality component 912. The channel quality component 912 may determine a plurality of channel qualities associated with a plurality of channels. The channel quality component 912 may provide the channel qualities to a channel selection component 906. The channel selection component 906 may select a set of channels from the plurality of channels based on the plurality of determined channel qualities.

The channel selection component 906 may determine CQIs for the selected set of channels based on the channel qualities. The channel selection component 906 may send, to the base station 950, the set of CQIs associated with the set of channels.

The PDCCH component 908 may receive, from the base station 950, information indicating sets of CCEs to monitor in a UE-specific search space and a common search space. The PDCCH component 908 may monitor sets of CCEs based on the information indicating sets of CCEs to monitor. The PDCCH component 908 may then receive control information carried on a PDCCH based on the monitoring of the sets of CCEs.

The apparatus may include additional components that perform each of the blocks of the algorithm in the aforementioned flowcharts of FIG. 7. As such, each block in the aforementioned flowcharts of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
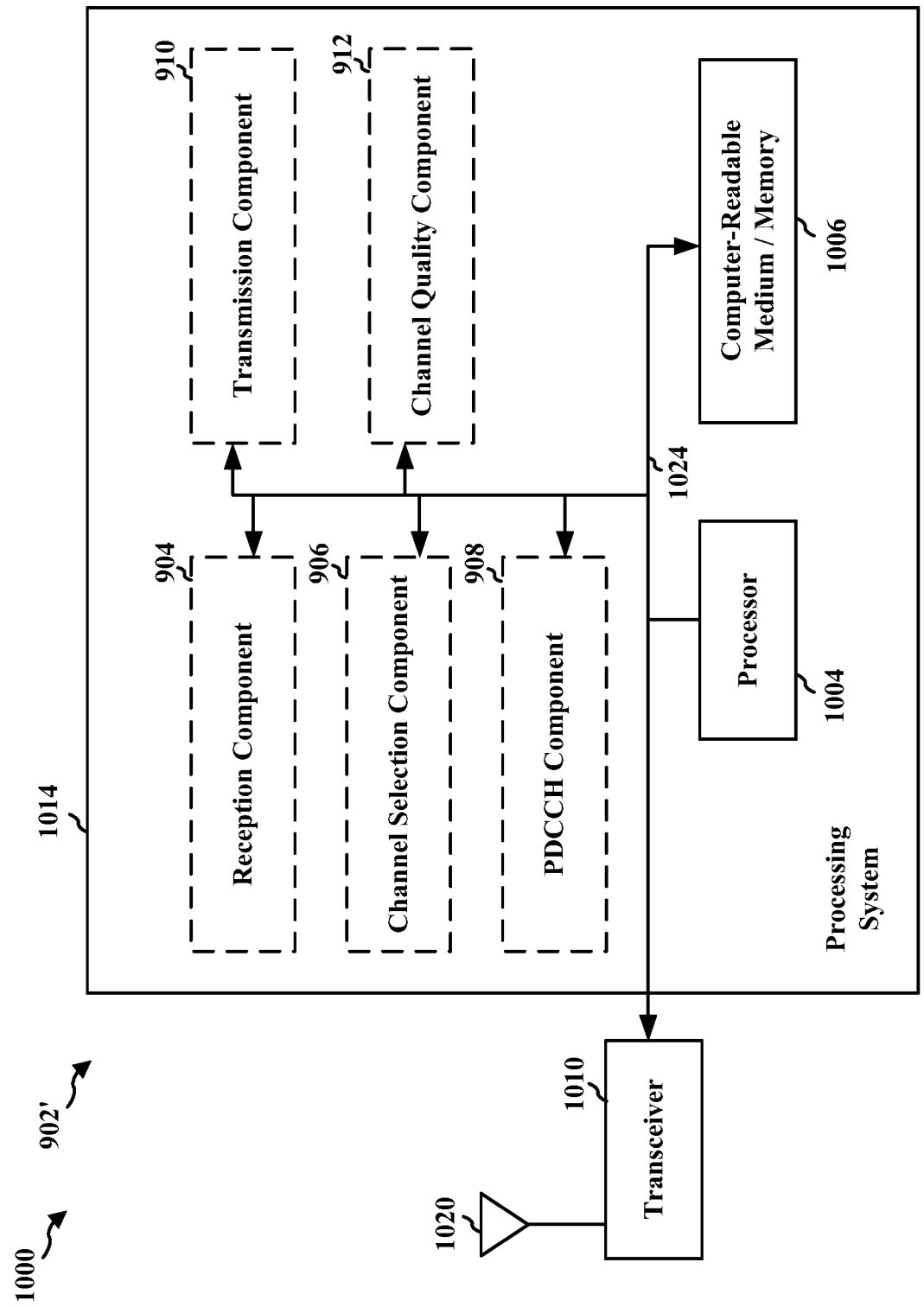
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 910, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication includes means for sending, to a base station, a set of CQIs associated with a set of channels. In an aspect, the apparatus 902/902' further includes means for monitoring sets of CCEs in a UE-specific search space based on the set of CQIs sent to the base station. In an aspect, the apparatus 902/902' further includes means for determining a plurality of channel qualities associated with a plurality of channels. In an aspect, the apparatus 902/902' further includes means for selecting the set of channels from the plurality of channels based on the determined plurality of channel qualities. In an aspect, the apparatus 902/902' further includes means for receiving control information associated with the apparatus 902/902' carried on a PDCCH based on the monitoring of the sets of CCEs in the UE-specific search space. In an aspect, the control information is further carried on the PDCCH in another set of CCEs in a common search space. In an aspect, the apparatus 902/902' further includes means for receiving, from the base station via RRC signaling, information indicating the set of CCEs to monitor in the UE-specific search space and a common search space.

The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
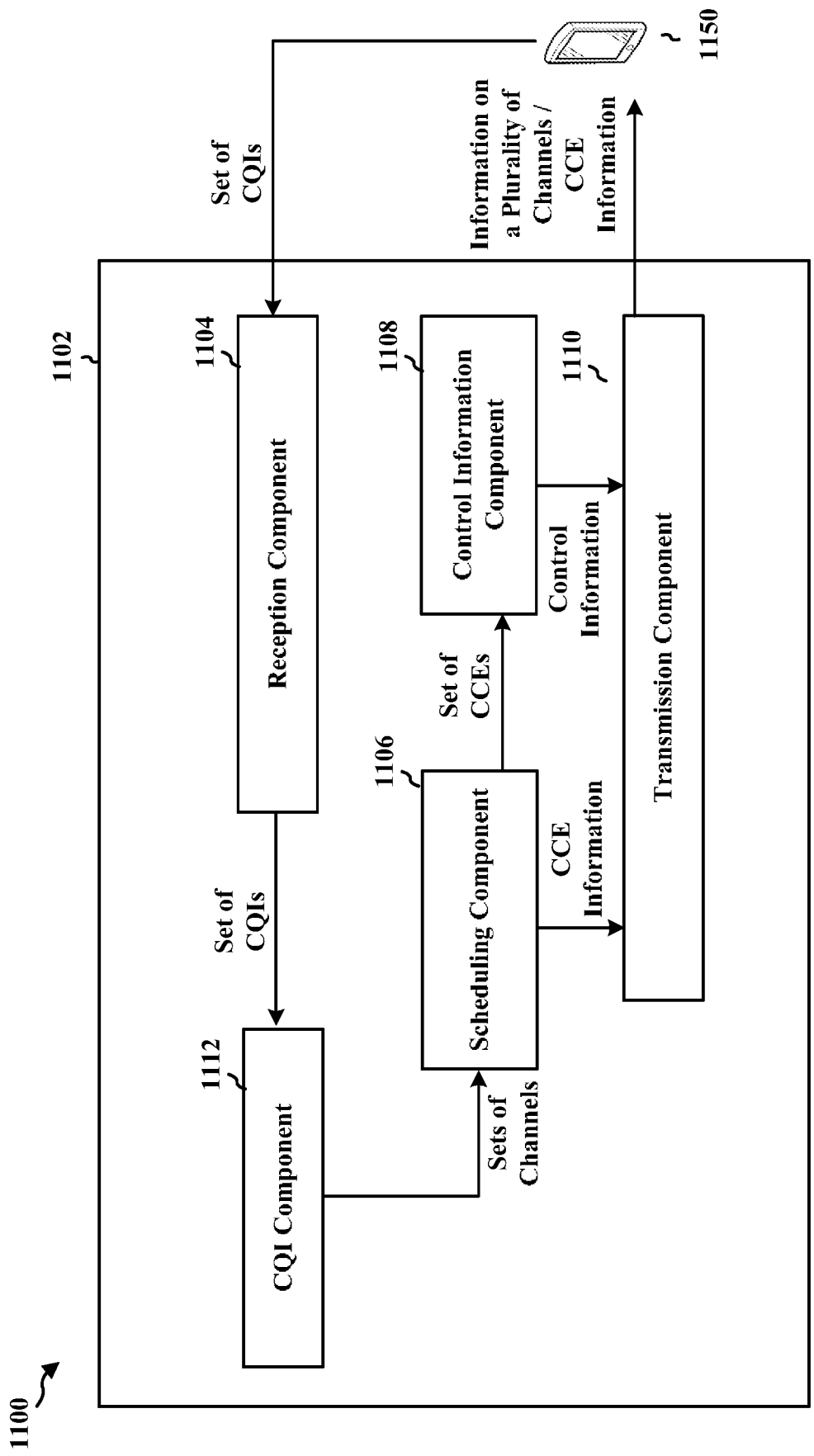
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus may be a base station. The illustrated components and/or data flow are illustrative and the apparatus 902 may include additional and/or other components and/or data flow.

The apparatus 1102 may include a transmission component 1110 configured to transmit signals to a UE (e.g., the UE 1150). The apparatus 1102 may include a reception component 1104 configured to receive signals from a UE (e.g., the UE 1150).

The apparatus 1102 may include a CQI component 1112. The CQI component 1112 may receive, from the UE 1150, a set of CQIs associated with a set of channels. In one aspect, the CQI component 1112 may receive a plurality of sets of CQIs, and each set of CQIs may be associated with a different subframe. The CQI component 1112 may be configured to determine the set of channels based on the plurality of sets of CQIs (e.g., the channels corresponding to the most frequently indicated or highest average CQIs). The CQI component 1112 may provide an indication of the one or more channels corresponding to the CQIs to a scheduling component 1106.

The scheduling component 1106 may determine, based on the one or more channels indicated by the CQI component 1112, a first set of CCEs for downlink control information associated with the UE 1150 carried on a PDDCH. The scheduling component 1106 may determine CCEs in a UE-specific search space, and the determined CCEs may correspond to the one or more indicated channels. The scheduling component 1106 may further select CCEs in a common search space.

In an aspect, the scheduling component 1106 may detect a collision between the first set of CCEs and another set of CCEs determined for another UE. Based on the detected collision, the scheduling component 1106 may select CCEs for the UE 1150 in a common search space. In another aspect, the scheduling component 1106 may be provided an indication of a decoding failure from the CQI component 1112 (e.g., when the CQI component 1112 fails to decode at least one CQI). Based on the decoding failure, the scheduling component 1106 may select CCEs for the UE 1150 in a common search space.

In an aspect, the scheduling component 1106 may dynamically or semi-statically determine CCEs for a search space for downlink control information carried on a PDCCH. For example, the scheduling component 1106 may select a next set of CCEs associated with a search space specific to the UE 1150, e.g., in a subsequent subframe. In other words, the scheduling component 1106 may adjust the search space formed for the UE 1150.

The scheduling component 1106 may send, to the UE 1150 via RRC signaling, information indicating the selected sets of CCEs. Further, the scheduling component 1106 may provide information indicating the sets of CCEs to a control information component 1108.

The control information component 1108 may send, to the UE 1150, control information carried on a PDCCH in the sets of CCEs indicated by the scheduling component 1106.

The apparatus may include additional components that perform each of the blocks of the algorithm in the aforementioned flowcharts of FIG. 8. As such, each block in the aforementioned flowcharts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
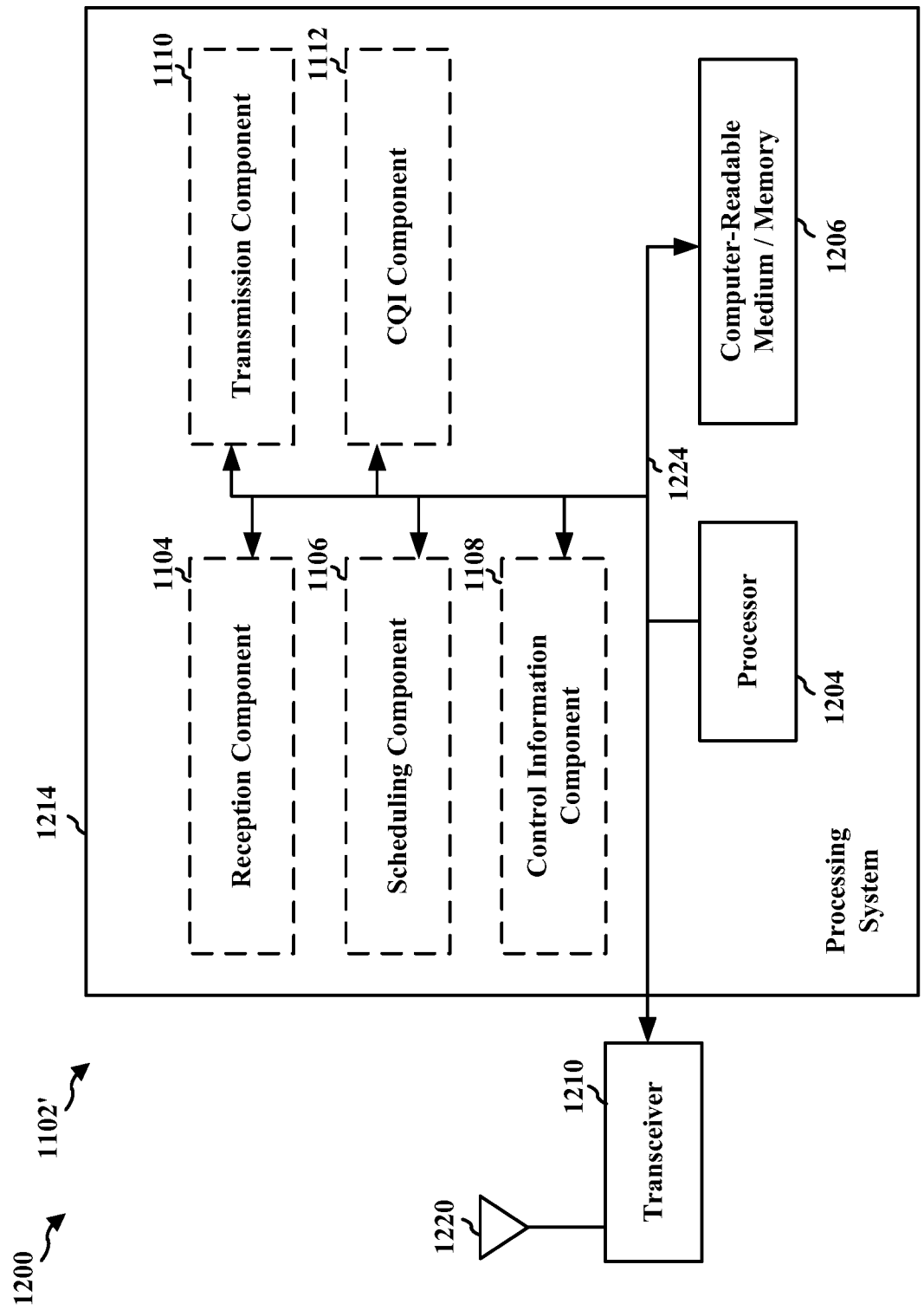
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1110, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112. The components may be software components running in the processor 1204, resident/stored in the computer readable medium/memory 1206, one or more hardware components coupled to the processor 1204, or some combination thereof. The processing system 1214 may be a component of the base station 310 and may include the memory 376 and/or at least one of the TX processor 316, the RX processor 370, and the controller/processor 375.

In one configuration, the apparatus 1102/1102' for wireless communication includes means for receiving, from a first UE, a set of CQIs associated with a set of channels. The apparatus 1102/1102' may include means for determining, based on the received set of CQIs, a first set of CCEs for a UE-specific search space specific to the first UE for receiving a PDCCH. The apparatus 1102/1102' may include means for sending, based on the determined first set of CCEs, downlink control information on the PDCCH in the UE-specific search space specific to the first UE. The apparatus 1102/1102' may include means for sending at least a portion of the downlink control information on the PDCCH in a common search space. The apparatus 1102/1102' may include means for detecting a collision between the first set of CCEs associated with the first UE and a second set of CCEs associated with a second UE, wherein downlink control information associated with the second UE is sent in the common search space based on the detected collision. The apparatus 1102/1102' may include means for decoding each CQI of the received set of CQIs, and means for detecting a decoding failure associated with at least one CQI of the received set of CQIs, wherein the downlink control information carried on the PDCCH is sent in the common search space based on the detected decoding failure. In an aspect, the first set of CCEs is determined based on a plurality of received sets of CQIs, each set of CQIs associated with a respective subframe. The apparatus 1102/1102' may include means for sending, to the first UE via RRC signaling, information indicating at least one of the first set of CCEs associated with the UE-specific search space specific to the first UE or a second set of CCEs associated with a common search space, wherein the downlink control information carried on the PDCCH is carried on the at least one of the first set of CCEs or the second set of CCEs. The apparatus 1102/1102' may include means for receiving, from the first UE, a second set of CQIs associated with a second set of channels, means for determining, based on the second set of CQIs, a second set of CCEs for second downlink control information carried on the PDCCH, and means for sending, based on the second set of CCEs, the second downlink control information carried on the PDCCH. In an aspect, the first set of CCEs are included in a first subframe and the second set of CCEs are included in a second subframe, the first set of CCEs included in the first subframe being in different locations than the second set of CCEs included in the second subframe.

The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:
1. A method of wireless communication for a base station, the method comprising:
  communicating with a first user equipment (UE) on a plurality of channels;
  receiving, from the first UE, a set of channel quality indicators (CQIs) associated with a set of channels that is a subset of the plurality of channels, the set of channels being based on channel qualities associated with the plurality of channels;
  determining, based on the received set of CQIs, a first set of control channel elements (CCEs) for a UE-specific search space specific to the first UE for receiving a physical downlink control channel (PDCCH) in at least one symbol allocated for control information; and sending, based on the determined first set of CCEs, downlink control information on the PDCCH in the UE-specific search space specific to the first UE.

2. The method of claim 1, further comprising:
sending at least a portion of the downlink control information on the PDCCH in a common search space.

3. The method of claim 2, further comprising:
detecting a collision between the first set of CCEs associated with the first UE and a second set of CCEs associated with a second UE,
wherein downlink control information associated with the second UE is sent in the common search space based on the detected collision.

4. The method of claim 2, further comprising:
decoding each CQI of the received set of CQIs; and
detecting a decoding failure associated with at least one CQI of the received set of CQIs,
wherein the downlink control information carried on the PDCCH is sent in the common search space based on the detected decoding failure.

5. The method of claim 1, wherein the first set of CCEs is determined based on a plurality of received sets of CQIs, each set of CQIs associated with a respective subframe.

6. The method of claim 1, further comprising:
sending, to the first UE via radio resource control (RRC) signaling, information indicating at least one of the first set of CCEs associated with the UE-specific search space specific to the first UE or a second set of CCEs associated with a common search space,
wherein the downlink control information carried on the PDCCH is carried on the at least one of the first set of CCEs or the second set of CCEs.

7. The method of claim 1, further comprising:
receiving, from the first UE, a second set of CQIs associated with a second set of channels;
determining, based on the second set of CQIs, a second set of CCEs for second downlink control information carried on the PDCCH; and
sending, based on the second set of CCEs, the second downlink control information carried on the PDCCH.

8. The method of claim 7, wherein the first set of CCEs are included in a first subframe and the second set of CCEs are included in a second subframe, the first set of CCEs included in the first subframe being in different locations than the second set of CCEs included in the second subframe.

9. An apparatus for wireless communication, the apparatus comprising:
means for communicating with a first user equipment (UE) on a plurality of channels:
means for receiving, from the first UE, a set of channel quality indicators (CQIs) associated with a set of channels that is a subset of the plurality of channels, the set of channels being based on channel qualities associated with the plurality of channels;
means for determining, based on the received set of CQIs, a first set of control channel elements (CCEs) for a UE-specific search space specific to the first UE for receiving a physical downlink control channel (PDCCH) in at least one symbol allocated for control information; and
means for sending, based on the determined first set of CCEs, downlink control information on the PDCCH in the UE-specific search space specific to the first UE.

10. The apparatus of claim 9, further comprising:
means for sending at least a portion of the downlink control information on the PDCCH in a common search space.

11. The apparatus of claim 10, further comprising:
means for detecting a collision between the first set of CCEs associated with the first UE and a second set of CCEs associated with a second UE,
wherein downlink control information associated with the second UE is sent in the common search space based on the detected collision.

12. The apparatus of claim 10, further comprising:
means for decoding each CQI of the received set of CQIs; and
means for detecting a decoding failure associated with at least one CQI of the received set of CQIs,
wherein the downlink control information carried on the PDCCH is sent in the common search space based on the detected decoding failure.

13. The apparatus of claim 9, wherein the first set of CCEs is determined based on a plurality of received sets of CQIs, each set of CQIs associated with a respective subframe.

14. The apparatus of claim 9, further comprising:
means for sending, to the first UE via radio resource control (RRC) signaling, information indicating at least one of the first set of CCEs associated with the UE-specific search space specific to the first UE or a second set of CCEs associated with a common search space,
wherein the downlink control information carried on the PDCCH is carried on the at least one of the first set of CCEs or the second set of CCEs.

15. The apparatus of claim 9, further comprising:
means for receiving, from the first UE, a second set of CQIs associated with a second set of channels;
means for determining, based on the second set of CQIs, a second set of CCEs for second downlink control information carried on the PDCCH; and
means for sending, based on the second set of CCEs, the second downlink control information carried on the PDCCH.

16. The apparatus of claim 15, wherein the first set of CCEs are included in a first subframe and the second set of CCEs are included in a second subframe, the first set of CCEs included in the first subframe being in different locations than the second set of CCEs included in the second subframe.

17. An apparatus for wireless communication, the apparatus comprising:
a memory; and
at least one processor coupled to the memory and configured to:
communicate with a first user equipment (UE) on a plurality of channels;
receive, from the first UE, a set of channel quality indicators (CQIs) associated with a set of channels that is a subset of the plurality of channels, the set of channels being based on channel qualities associated with the plurality of channels;
determine, based on the received set of CQIs, a first set of control channel elements (CCEs) for a UE-specific search space specific to the first UE for receiving a physical downlink control channel (PDCCH) in at least one symbol allocated for control information; and
send, based on the determined first set of CCEs, downlink control information on the PDCCH in the UE-specific search space specific to the first UE.

18. The apparatus of claim 17, wherein the at least one processor is further configured to:
send at least a portion of the downlink control information on the PDCCH in a common search space.

19. The apparatus of claim 18, wherein the at least one processor is further configured to:
detect a collision between the first set of CCEs associated with the first UE and a second set of CCEs associated with a second UE,
wherein downlink control information associated with the second UE is sent in the common search space based on the detected collision.

20. The apparatus of claim 18, wherein the at least one processor is further configured to:
decode each CQI of the received set of CQIs; and
detect a decoding failure associated with at least one CQI of the received set of CQIs,
wherein the downlink control information carried on the PDCCH is sent in the common search space based on the detected decoding failure.

21. The apparatus of claim 17, wherein the first set of CCEs is determined based on a plurality of received sets of CQIs, each set of CQIs associated with a respective subframe.

22. The apparatus of claim 17, wherein the at least one processor is further configured to:
send, to the first UE via radio resource control (RRC) signaling, information indicating at least one of the first set of CCEs associated with the UE-specific search space specific to the first UE or a second set of CCEs associated with a common search space,
wherein the downlink control information carried on the PDCCH is carried on the at least one of the first set of CCEs or the second set of CCEs.

23. The apparatus of claim 17, wherein the at least one processor is further configured to:
receive, from the first UE, a second set of CQIs associated with a second set of channels;
determine, based on the second set of CQIs, a second set of CCEs for second downlink control information carried on the PDCCH; and
send, based on the second set of CCEs, the second downlink control information carried on the PDCCH.

24. The apparatus of claim 23, wherein the first set of CCEs are included in a first subframe and the second set of CCEs are included in a second subframe, the first set of CCEs included in the first subframe being in different locations than the second set of CCEs included in the second subframe.

25. A non-transitory computer-readable medium storing computer-executable code for wireless communication by a base station, the code comprising instructions executable by a processor to:
communicate with a first user equipment (UE) on a plurality of channels;
receive, from the first UE, a set of channel quality indicators (CQIs) associated with a set of channels that is a subset of the plurality of channels, the set of channels being based on channel qualities associated with the plurality of channels;
determine, based on the received set of CQIs, a first set of control channel elements (CCEs) for a UE-specific search space specific to the first UE for receiving a physical downlink control channel (PDCCH) in at least one symbol allocated for control information; and
send, based on the determined first set of CCEs, downlink control information on PDCCH ire the UE-specific search space specific to the first UE.

26. The non-transitory computer-readable medium of claim 25, wherein the instructions are further executable by the processor to:
send at least a portion of the downlink control information on the PDCCH in a common search space.

27. The non-transitory computer-readable medium of claim 26, wherein the instructions are further executable by the processor to:
detect a collision between the first set of CCEs associated with the first UE and a second set of CCEs associated with a second UE,
wherein downlink control information associated with the second UE is sent in the common search space based on the detected collision.

28. The non-transitory computer-readable medium of claim 26, wherein the instructions are further executable by the processor to:
decode each CQI of the received set of CQIs; and
detect a decoding failure associated with at least one CQI of the received set of CQIs,
wherein the downlink control information carried on the PDCCH is sent in the common search space based on the detected decoding failure.

29. The non-transitory computer-readable medium of claim 25, wherein the first set of CCEs is determined based on a plurality of received sets of CQIs, each set of CQIs associated with a respective subframe.

30. The non-transitory computer-readable medium of claim 25, wherein the instructions are further executable by the processor to:
send, to the first UE via radio resource control (RRC) signaling, information indicating at least one of the first set of CCEs associated with the UE-specific search space specific to the first UE or a second set of CCEs associated with a common search space,
wherein the downlink control information carried on the PDCCH is carried on the at least one of the first set of CCEs or the second set of CCEs.

* * * * *